United States Patent [19]

Nield

[11] 4,222,348
[45] Sep. 16, 1980

[54] STARTER-GROWER CAGE

[75] Inventor: James M. Nield, Northville, Mich.

[73] Assignee: Diamond International Corporation, New York, N.Y.

[21] Appl. No.: 6,512

[22] Filed: Jan. 25, 1979

[51] Int. Cl.³ .............................................. A01K 31/06
[52] U.S. Cl. ............................................ 119/17; 119/18
[58] Field of Search ........................ 119/17, 18, 19, 21

[56] References Cited

U.S. PATENT DOCUMENTS

| 2,061,712 | 11/1936 | Martin | 119/18 X |
| 2,068,566 | 1/1937 | Olson et al. | 119/18 X |
| 2,698,004 | 12/1954 | Luther | 119/18 X |
| 3,738,323 | 6/1973 | Baterweg | 119/18 |

Primary Examiner—Hugh R. Chamblee
Attorney, Agent, or Firm—Kenyon & Kenyon

[57] ABSTRACT

A starter-grower cage for animals particularly for poultry is disclosed. The cage includes a pivotable partition which forms part of the entire cage in one position and part of a smaller cage in another position. In the illustrated embodiment, the top of the cage is formed by two adjacently disposed members one of which is pivotable between a horizontal position where it forms part of the top for the entire cage and a vertical position where it forms an end of a smaller partitioned cage.

8 Claims, 6 Drawing Figures

U.S. Patent  Sep. 16, 1980  Sheet 1 of 2  4,222,348
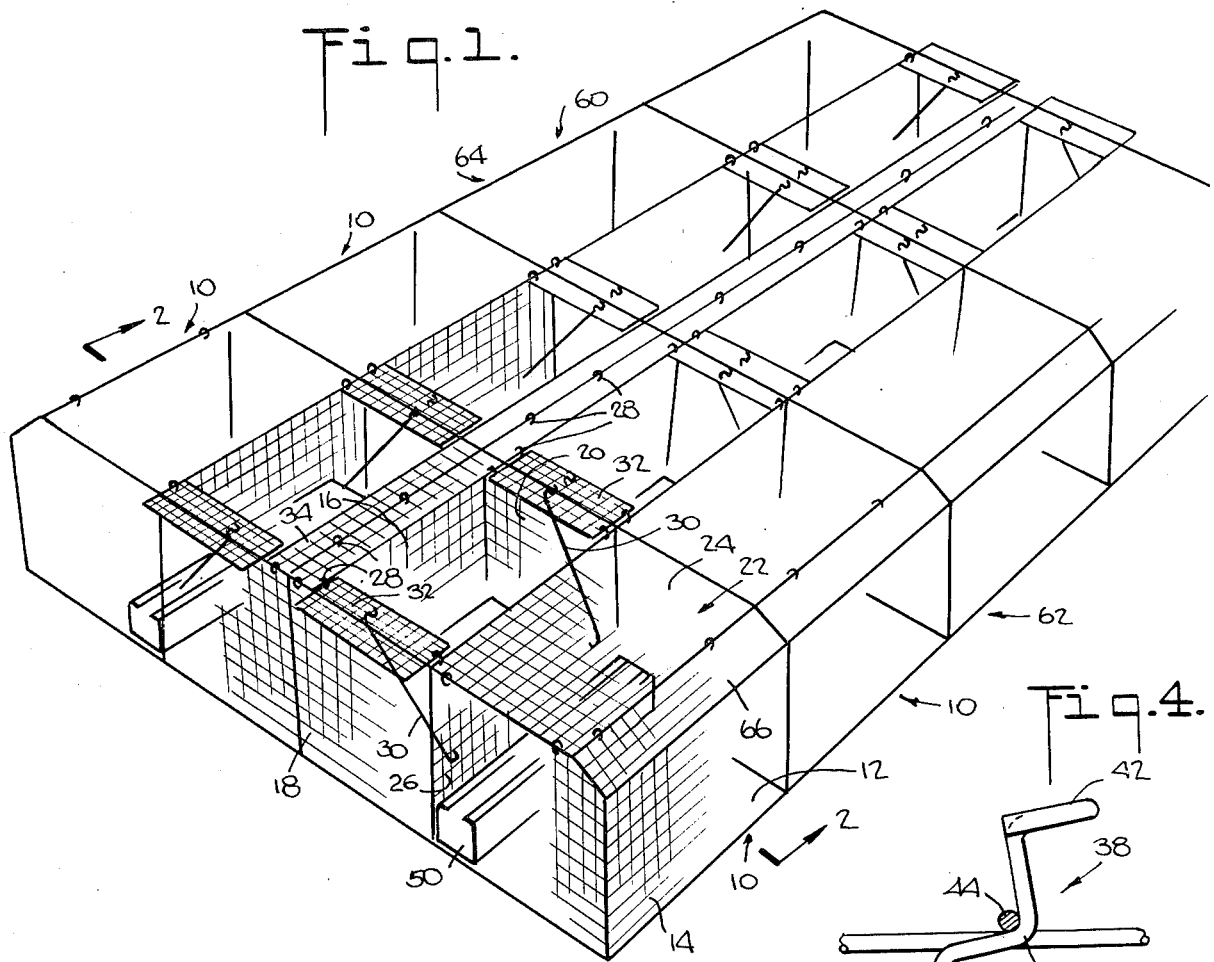
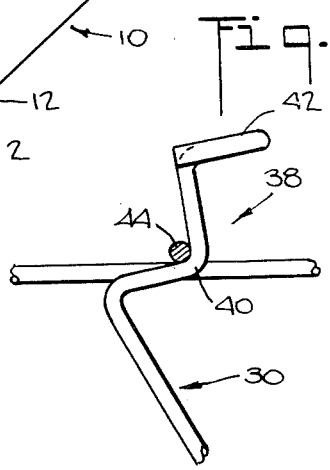
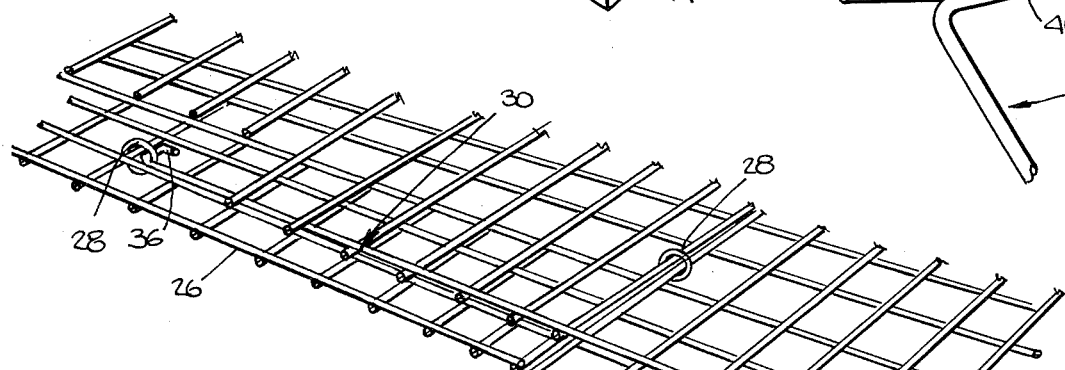
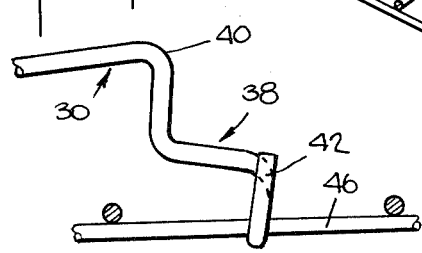

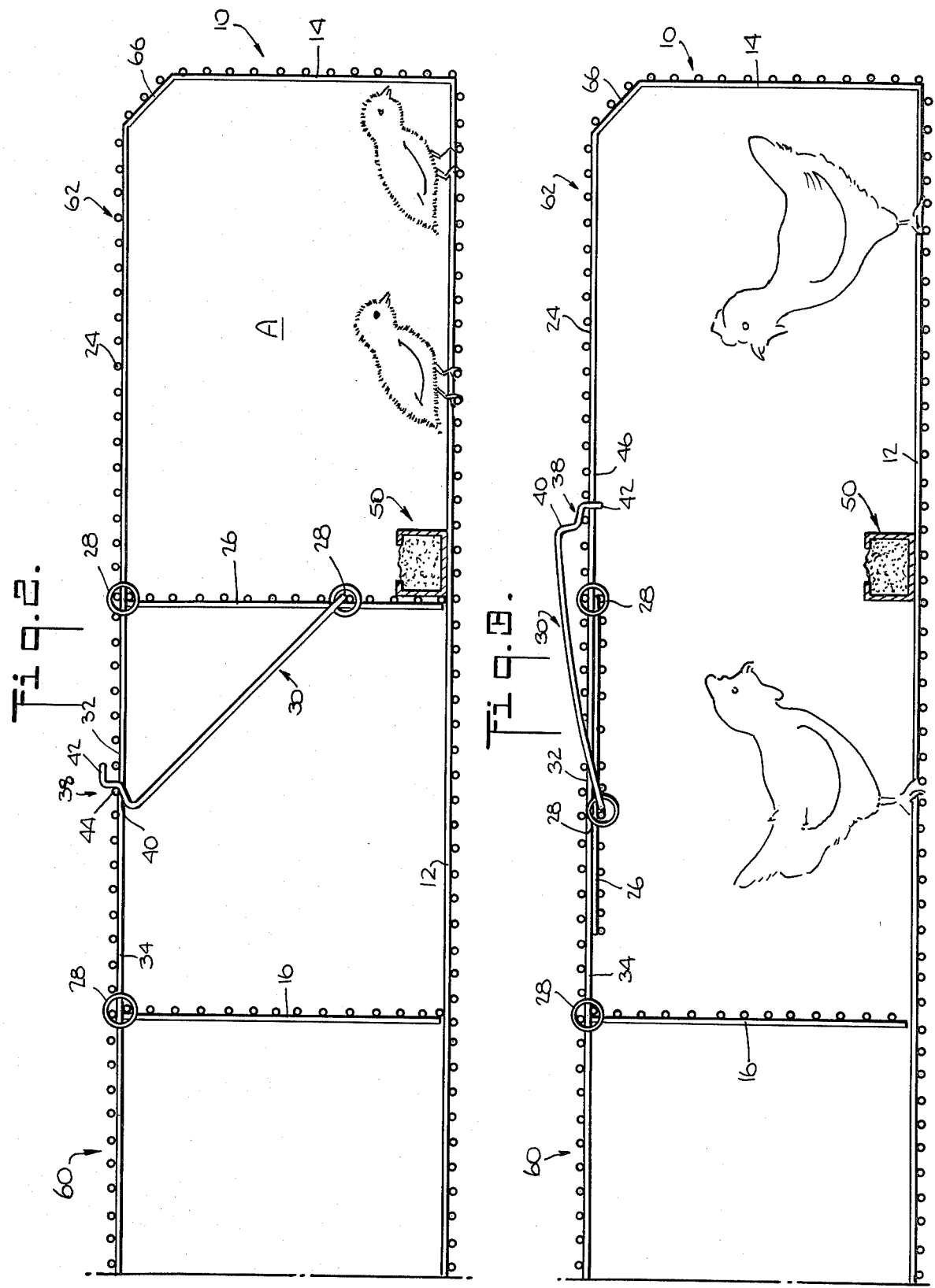

STARTER-GROWER CAGE

The present invention relates to cages for animals particularly for poultry, and more particularly to a starter-grower cage for chickens.

In raising poultry, different types of cages are desirable and sometimes necessary for starters, growers and layers. However, to minimize the number of different types of cages required, it is known to provide a combined starter-grower cage and a combined starter-grower-laying cage. In one known starter-grower cage, a partition is provided which subdivides the cage into a smaller cage for starters. As the starters grow and require more room, the partition is moved from its separating position so that cage space is enlarged to encompass the entire cage. U.S. Pat No. 3,757,741 to Anthony J. Sicilano discloses another cage which can be used for starters, growers and layers. However, in each of the known types of combined cages, substantial additional cage material is required in order to use the cage for the different size and age poultry and for different purposes such as growing and laying.

By the invention disclosed herein, a cage is provided that may be used for different size and age animals and which requires a substantially reduced amount of additional cage material to accomodate the different size and age animals.

SUMMARY OF THE INVENTION

It is an object of the present invention to provide a more economical animal cage that is adjustable in volume.

It is another object of the present invention to provide an animal cage that is adjustable in volume without requiring substantial additional cage material and which can be used for animals as they grow in size.

It is also an object of the present invention to provide an animal cage that can be used for growing animals in which the cage can be selectively partitioned without requiring substantial additional cage material to form smaller and larger cage volumes.

It is still another object of the present invention to provide a poultry cage that can be used for starters and growers in which the cage volume can be reduced for smaller sized poultry and increased when the poultry grows to a larger size without requiring substantial additional cage material.

These and other objects of the present invention are achieved in accordance with the invention in which a cage is provided with a movable member which forms part of the entire cage in one position thereof and forms part of a smaller cage in another position thereof.

In the disclosed embodiment, the movable member is a section of the top of the cage and is pivotable from a position in which it is part of the top of the entire cage to another position in which it is a partition forming part of a smaller cage.

A cage according to the invention for confining animals particularly poultry comprises a floor, two ends, two sides and a top. The top comprises a first section and a second section which are adjacently disposed with the first section being adjacent to one end of the cage. The floor, the two ends, the two sides and the top first section are fixedly connected and the top second section is pivotably connected and is pivotable to swing between two positions. In one position, the second section extends to the other end of the cage opposed to said one end such that the first and second sections form the top for the entire cage. In another position, the second section extends to the floor of the cage such that the second section forms a partition for a smaller cage defined by the top first section as the cage top, the second section as one end of the cage, said one cage end as the other end of the cage, and portions of the two sides and floor as the sides and floor of the smaller cage. Preferably the top second section is hinged to the top first section, the cage has generally rectangular prism (solid rectangular) shape and the top second section is pivotable between a substantially horizontal position and a substantially vertical position.

Means are provided in accordance with the invention to maintain the top second section in each of the described positions and are disclosed to comprise at least one flexible member connected to the top second section which is adapted to releasably engage the cage in each said position of the top second section to thereby secure the top second section in each said position, and material disposed at the top of the sides and rear of the cage to form a jam for the top second section when it is in the said one (e.g. horizontal) position. The flexible member is preferably a spring wire having its free end arcuately shaped and adapted to be releasably engaged by the jam when the top second section is in said other (e.g. vertical) position and by the top first section when the top second section is in said one (e.g. horizontal) position. The cage also preferably includes a trough transversely extending in the cage along the floor thereof, such that the top second section butts against the trough in said other (e.g. vertical) position thereof.

These and other aspects of the invention will be more apparent from the following description of the preferred embodiment thereof when considered with the accompanying drawings and appended claims.

BRIEF DESCRIPTION OF THE DRAWINGS

The present invention is illustrated by way of example and not limitation in the figures of the accompanying drawings in which like references indicate similar parts and in which:

FIG. 1 is a perspective view of a battery of starter-grower cages according to the invention;

FIG. 2 is cross-sectional view taken along line 2—2 of FIG. 1 and depicting a starter-grower cage according to the invention being utilized as a starter cage with a reduced volume;

FIG. 3 is cross-sectional view similar to that of FIG. 2 depicting the cage of FIGS. 1 and 2 in which the entire volume is being utilized;

FIG. 4 is an enlarged side view of a portion of one of the spring wires used to secure the hinged top section of the cage in the position shown in FIGS. 1 and 2;

FIG. 5 is a partial perspective view of a portion of a cage of the battery of FIG. 1 depicting a spring wire engaged in the position of FIG. 3; and FIG. 6 is an enlarged side view of a portion of the spring wire of FIG. 5 engaged in the position of FIG. 3.

DESCRIPTION OF THE PREFERRED EMBODIMENT

Referring now more particularly to the drawings, a starter-grower cage for chickens is illustrated. In FIG. 1, a battery of starter-grower cages 10 is shown. Each starter-grower cage 10 comprises a floor 12, opposed ends 14, 16, opposed sides 18, 20 and a top 22. The top 22 is formed of two sections 24 and 26 (FIG. 3). The floor 12, ends 14, 16, sides 18, 20 and the top section 24 are fixed together in conventional fashion to form a substantially rigid cage. Top section 26 is hinged to top section 24 by rings 28 and can be swung from the horizontal position shown in FIG. 3 to the vertical position shown in FIGS. 1 and 2.

A jam is formed for the top section 26 when it is in the horizontal position of FIG. 3 and includes: cage material 32 disposed at the top of the cage sides 18, 20 adjacent to the rear of the top section 24; and cage material 34 disposed along the top of end 16 of the cage. The cage material 32 and 34 is secured to the respective cage parts by means of rings 28. The jam prevents clockwise movement of the top section 26 from the horizontal position of FIG. 3 as described hereinafter.

Spring wires 30 are pivotably connected to the top section 26 by rings 28 and are utilized to lock the top section 26 in each of its horizontal and vertical positions. As shown in FIG. 5, a hooked section 36 is provided at one end of the spring wire 30 and a locking section 38 is provided at the other end of the spring wire. A ring 28 is looped around a wire rung of the top section and the hooked section 36 of the spring wire is inserted in the loop to pivotably secure the spring wire 30 to the top section 26. The locking section 38 of the spring wire 30 includes an indent portion 40 and a hooked portion 42. Both the indent portion and the hooked portion extend transversely of the longitidinal axis of the spring wire. The indent portion 40 is used to lock the top section 26 in the vertical position shown in FIGS. 1 and 2. Locking is accomplished by drawing the hooked portion 42 through an opening in the mesh material 32 disposed at the top of the sides of the cage until the indent 40 is engaged by a wire 44 forming the opening in material 32 (FIGS. 2 and 4). The spring wire 30 and the engaged indent 40 prevent clockwise pivoting of the top section 26.

The top section 26 is released by pulling on the hooked portion 42 in a clockwise direction with respect to FIG. 2 to disengage the wire 44 and the indent 40. Upon disengagement of the indent 40, the spring wire 30 and the top section 26 connected thereto are freely pivotable towards the horizontal position of the top section 24. The spring wire 30 is drawn through the opening in the cage material until the top section 26 engages the jam formed by material 32, 34 along the sides and rear of the cage. The top section 26 is locked in the horizontal position by inserting the hooked portion 42 through a hole in the top section 24 of the cage and twisting the spring wire until the hook engages a wire member 46 forming part of the top section 24. The jam formed by material 32, 34 prevents the top section 26 from being pivoted further in a clockwise direction and the locked spring wire 30 prevents the top section 26 from being pivoted in a counterclockwise direction. Thus, the top section 26 is securely locked in the horizontal position. To unlock the spring wire 30 in this position, it is twisted to disengage the hooked portion 42 from wire 46.

A feed trough 50 may be utilized to stabilize the top section 26 when it is in the vertical position of FIGS. 1 and 2. To accomplsih this, the feed trough 50 extends transversely across the cage floor 12 along the location at the cage floor at which the top section 26 extends when it is in the vertical position. As shown in FIG. 2, the top section 26 is butted against the feed trough 50 to prevent further counterclockwise pivoting of the top section 26. Since the spring wire 30 prevents clockwise pivoting of the top section 26 in the vertical position thereof as described, the top section is securely held in its vertical position.

In use, small chicks are placed in the smaller cage volume designated A (FIG. 2) which is formed in part by the top section 26 in its pivoted vertical position and acts as a partition separating the smaller volume A from the remainder of the cage. The chicks have access while in the partitioned section A to both feed from feed trough 50 and to a water trough (not shown) secured to the outside of cage end 14. As the chicks grow and require more room, spring wire 30 is disengaged from jam material 32 and pivoted to the horizontal position shown in FIG. 3 and locked as described hereinbefore. The larger chickens now have access to the entire cage volume and retain access to the feed trough 50 and the water trough.

A substantial savings in cage material is realized by use of the pivoting top section 26 as a partition for the partitioned cage A and for part of the top of the entire cage. The change to partition or enlarge the cage volume is easily and quickly made without requiring substantial additional cage material. Thus, the cage material which otherwise would be used for a partition in addition to the top or sides of the cage is eliminated. The savings in material becomes significant when one realizes that cages are assembled in batteries which may have two or more tiers and in some instances may extend for several hundred feet or more.

Referring again now to FIG. 1, an 8-cage battery 60 is illustrated. It is understood that several batteries may be juxtaposed and the batteries may be arranged in two or more tiers. However, for purposes of clarity, only a single battery is shown. Cage battery 60 comprises a forward section 62 and a rear section 64. Each section 62 and 64 comprises four juxtaposed cages. Section 62 includes a forward end, a floor, a top according to the invention, and sides, with the interior cages having common sides. Section 64 is similar to section 62 and also includes for each cage a rear section. The two sections 62, 64 are joined and attached by rings 28, for example. The jams for the pivotable top section are assembled as follows. Jam material 34 is formed by individual net strips which extend for the length of the battery, each strip being disposed over the location above which the rears of the cages meet. Individual sections 32 are then disposed at the top of the cage sides and extend over adjacent cages. Sections 32 and 24 are secured to the cages by rings 38 as described hereinbefore.

Troughs 50 extend through the sides of the interior cages and continuously extend from one side of the battery to the other.

Another hinged section 66 is provided at the front of each cage to provide access to the interior of each cage.

The advantages of the present invention, as well as certain changes and modifications of the disclosed embodiment thereof will be readily apparent to those skilled in the art. It is the applicant's intention to cover by his claims all those changes and modifications which could be made to the embodiment of the invention herein chosen for the purpose of the disclosure without departing from the spirit and scope of the invention.

What is claimed is:

1. A cage for confining animals particularly poultry comprising a floor, ends, sides and a top, the top comprising a first section and a second section which are adjacently disposed with the first section being adjacent to one end of the cage, the floor, ends, sides and the top first section being fixedly connected, the top second section being pivotably connected and pivotable between a position in which the top second section extends to the other end of the cage such that the first and second top sections form the top for the entire cage and another position in which the top second section extends to the floor of the cage such that the top first section forms the top of a smaller cage defined by the top first section, the top second section, said one end, and portions of the sides and floor, said cage including means to maintain the top second section in each of said positions, said maintaining means including at least one flexible wire-like member pivotably connected to the top second section and having its free end shaped to be releasably engaged by a portion of the cage when the top second section is in said other position and by another portion of the cage when the top second section is in said one position.

2. A cage as recited in claim 1, wherein the top second section is hinged to the top first section.

3. A cage as recited in claim 1, wherein the cage has a generally rectangular prism shape and the top second section is pivotable between a substantially horizontal position and a substantially vertical position.

4. A cage as recited in claim 1, wherein said maintaining means includes a trough transversely extending in the cage along the floor thereof, the top second section butting against the trough in said other position thereof.

5. A battery of the cages recited in claim 1 which comprises a plurality of said cages arranged in juxtaposition with interior cages having common sides at which the cages are joined.

6. A battery of cages as recited in claim 5 and comprising a plurality of additional cages disposed with respective cages in an end-to-end arrangement, pairs of respective cages having a common end at which the cages are joined.

7. A cage as recited in claim 1, wherein the free end of the wire-like member is hooked and includes a shaped detent.

8. A cage as recited in claim 7, wherein said maintaining means comprises material disposed at the top of the cage sides to form a jam for the top second section when it is in the said one position, the material extending from adjacent the top first section to adjacent said other end of the cage, the hooked free end of the wire-like member being engaged in the jam in said other position and the detent being engaged by the top first section in said one position.

* * * * *